United States Patent [19]

Margolin et al.

[11] Patent Number: 4,895,209

[45] Date of Patent: Jan. 23, 1990

[54] COMBINE APPARATUS

[75] Inventors: Ehud Margolin, Tel Aviv; Ron Feller, Ramat Efal, both of Israel

[73] Assignee: State of Israel, Ministry of Agriculture, Bet Dagan, Israel

[21] Appl. No.: 68,151

[22] Filed: Jun. 29, 1987

[30] Foreign Application Priority Data

Jun. 29, 1986 [IL] Israel .................................. 79276

[51] Int. Cl.⁴ .......................................... A01D 13/00
[52] U.S. Cl. ..................................... 171/18; 171/11; 171/138
[58] Field of Search ...................... 171/18, 138, 10, 11

[56] References Cited

U.S. PATENT DOCUMENTS

| | | |
|---|---|---|
| 1,641,492 | 9/1927 | Jasperson . |
| 1,692,343 | 11/1928 | Müller . |
| 2,114,263 | 4/1938 | Heaslet .................................. 171/18 |
| 2,666,524 | 1/1954 | Payne .................................... 209/119 |
| 2,698,506 | 1/1955 | Rushfeldt . |
| 2,932,393 | 4/1960 | Leslie .................................... 209/119 |
| 3,125,097 | 3/1964 | McRobert . |
| 4,281,766 | 8/1981 | Constantin ........................... 209/637 |
| 4,535,891 | 8/1985 | Shell ..................................... 209/665 |

FOREIGN PATENT DOCUMENTS

| | | |
|---|---|---|
| 131758 | 3/1949 | Australia . |
| 175628 | 9/1981 | Australia . |
| 872685 | 2/1953 | Fed. Rep. of Germany . |
| 1126661 | 3/1962 | Fed. Rep. of Germany . |
| 2312111 | 9/1972 | Fed. Rep. of Germany ........ 171/18 |
| 3306769 | 2/1983 | Fed. Rep. of Germany . |
| 480686 | 3/1918 | France . |
| 1513792 | 1/1968 | France . |
| 2261075 | 2/1975 | France . |
| 8301221 | 11/1984 | Netherlands . |
| 329637 | 6/1958 | Switzerland . |
| 755238 | 3/1979 | U.S.S.R. . |
| 755283 | 8/1980 | U.S.S.R. .............................. 171/18 |
| 887038 | 12/1981 | U.S.S.R. . |
| 1055390 | 11/1983 | U.S.S.R. . |
| 1210704 | 2/1986 | U.S.S.R. . |
| 5783 | of 1899 | United Kingdom . |
| 4684 | of 1909 | United Kingdom . |
| 350497 | 6/1931 | United Kingdom . |
| 708024 | 4/1954 | United Kingdom . |
| 776567 | 6/1957 | United Kingdom .................. 171/18 |
| 890031 | 2/1962 | United Kingdom .................. 171/18 |
| 1177136 | 1/1970 | United Kingdom . |
| 1419348 | 6/1973 | United Kingdom . |
| 2037186 | 9/1980 | United Kingdom .................. 171/18 |

OTHER PUBLICATIONS

Agricultural Engineering Record, vol. 2, Oct 1947-1949, Pub. H. M. Stationary Office London, pp. 33-42.

R. Feller et al., Separation of Soil Clods from Onion Using Impact, Transaction of ASAE, Sep. 1984, 353-357.

R. Feller et al., Development of a Clod Separator for Potato Packing Houses, ASAE 1985, vol. 38(4), Aug. 1985, pp. 1019-1023.

Maack, Die Merchanische trennung von kartoffeln und steinen. Heft 3 (Sep. 1957) pp. 71-78.

Derwent Publns. Ltd., Russian Summary, Week D17, Jun. 3, 1981, London (Abstract of SU755238).

Gan-Mor et al., "Absorbing Stone Impact to Enable Separation from Potatoes".

Opposition Against Patent Application No. 830074 (NL).

*Primary Examiner*—Robert E. Garrett
*Assistant Examiner*—Therese M. Newholm
*Attorney, Agent, or Firm*—Nixon & Vanderhye

[57] ABSTRACT

Mobile combine apparatus for harvesting and separating a mixture of agricultural produce such as potatoes from other materials such as clods and stones including an impact element defining an impact surface, and apparatus for causing the mixture of agricultural products and stones to impinge on the impact surface in a predetermined direction irrespective of the orientation of the combine apparatus within a given range of operative orientations.

11 Claims, 10 Drawing Sheets

COMBINE APPARATUS

FIELD OF THE INVENTION

The present invention relates to agricultural apparatus generally and more particularly to mobile combines for separating agricultural produce from spurious matter such as clods and stones.

BACKGROUND OF THE INVENTION

Certain agricultural products, such as potatoes, which grow under the ground, may need to be separated from clods and stones before being marketed. There is described in Applicant/Assignee's published German patent application Ser. No. P 33 06 769.4 apparatus for separation of a mixture of soil clods from potatoes by bouncing the mixture to be separated on a cylindrical drum. This apparatus operates on the basis of a difference of about 0.4 in the restitution coefficient of the potatoes and soil clods. The aforesaid apparatus has met with considerable commercial success.

The separation of potatoes from stones is not achieved by the apparatus of the aforesaid German Patent Application, since the restitution coefficients of potatoes and stones against a rigid surface are nearly the same, and the restitution coefficient of the stones normally may even exceed that of the potatoes.

SUMMARY OF THE INVENTION

The present invention seeks to provide mobile combine apparatus for separation of agricultural products from spurious matter such as clods and stones by bouncing.

There is thus provided in accordance with an embodiment of the present invention, mobile combine apparatus for harvesting and separating a mixture of agricultural produce such as potatoes from other materials such as clods and stones including an impact element defining an impact surface, and apparatus for causing the mixture of agricultural products and stones to impinge on the impact surface in a predetermined direction irrespective of the orientation of the combine apparatus within a given range of operative orientations.

According to one embodiment of the invention, the impact element comprises a generally cylindrical separation roller.

According to another, preferred embodiment of the invention, the impact element is operative to absorb appreciable kinetic energy from stones but to absorb a significantly lower amount of kinetic energy from agricultural products sought to be separated therefrom.

In accordance with the foregoing preferred embodiment of the present invention, the impact element comprises a plate element. The term "plate" is used to denote a relatively thin element which is susceptible to bending and is not used here in its limiting sense to refer only to planar elements. Rather, the plate element may comprise a planar or somewhat curved slab of material or, alternatively, for example, such a slab curved into a continuous ring defining a cylindrical surface. Although the phenomenon of energy absorption by the element is not fully understood by applicants, it is understood that the primary mechanism for kinetic energy absorption by the plate element is through bending thereof and the propagation of vibrations therethrough.

According to this aspect of the present invention, whose effectiveness has been demonstrated empirically, stones, which are characterized by greater density and hardness than agricultural produce such as potatoes, lose relatively more energy to the impact element than do such potatoes and the like, whose softer structure allows more compression and spreading out of the impact forces over a longer contact time, with the result that the potatoes bounce further from the impact surface than do stones and are separated thereby.

Selection of an appropriate element and mounting therefore for separation of a given agricultural product having given characteristics of density, elasticity, hardness and mass from stones and clods of known characteristics is achieved empirically, based on the teachings of the present invention, provided herein.

Additionally in accordance with a preferred embodiment of the invention, the impact element comprises a plate element which is resiliently mounted, whereby during the characteristic dwell time of stones in contact with the impact surface, significant energy absorption occurs, while during the longer dwell time of agricultural produce thereon, the net energy absorption is relatively insignificant, thereby causing the restitution coefficient of the agricultural produce to exceed that of the stones.

Further in accordance with an embodiment of the present invention, the impact element comprises a plurality of independently mounted sections, each of which is arranged to be impacted by a single stone or item of agricultural produce at any given instant.

Further in accordance with a preferred embodiment of the present invention, there is provided mobile combine apparatus for harvesting and separating a mixture of agricultural produce such as potatoes from other materials such as clods and stones including an impact element defining an impact surface, and apparatus for causing the mixture of agricultural products and stones to impinge on the impact surface in a predetermined direction irrespective of the orientation of the combine apparatus within a given range of operative orientations, first collection apparatus disposed in a first region with respect to the impact surface for receiving agricultural produce bounced from the impact surface within a first range of distances and second collection apparatus alongside the first region for receiving a mixture of unseparated agricultural produce, clods and stones bounced from the impact surface, and apparatus for resupplying the mixture of unseparated agricultural produce from the second collection apparatus back to an impact surface for repeated separation.

Additionally in accordance with an embodiment of the present invention, the above described apparatus for separating stones and clods from agricultural produce includes apparatus for limiting the resupply from the second collection apparatus to one resupply cycle.

In accordance with a preferred embodiment of the invention, the apparatus for causing the mixture of agricultural products and stones to impinge on the impact surface in a predetermined direction irrespective of the orientation of the combine apparatus within a given range of operative orientations comprises apparatus for maintaining the impact surface in a predetermined orientation notwithstanding variations in the orientation of the combine.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

The present invention will be described in the context of a preferred embodiment thereof, combine apparatus for the harvesting and separation of agricultural products, such as potatoes, from clods and stones. It is appreciated that the present invention has application in various other contexts and is not limited to the context described hereinbelow.

Figure 1A:
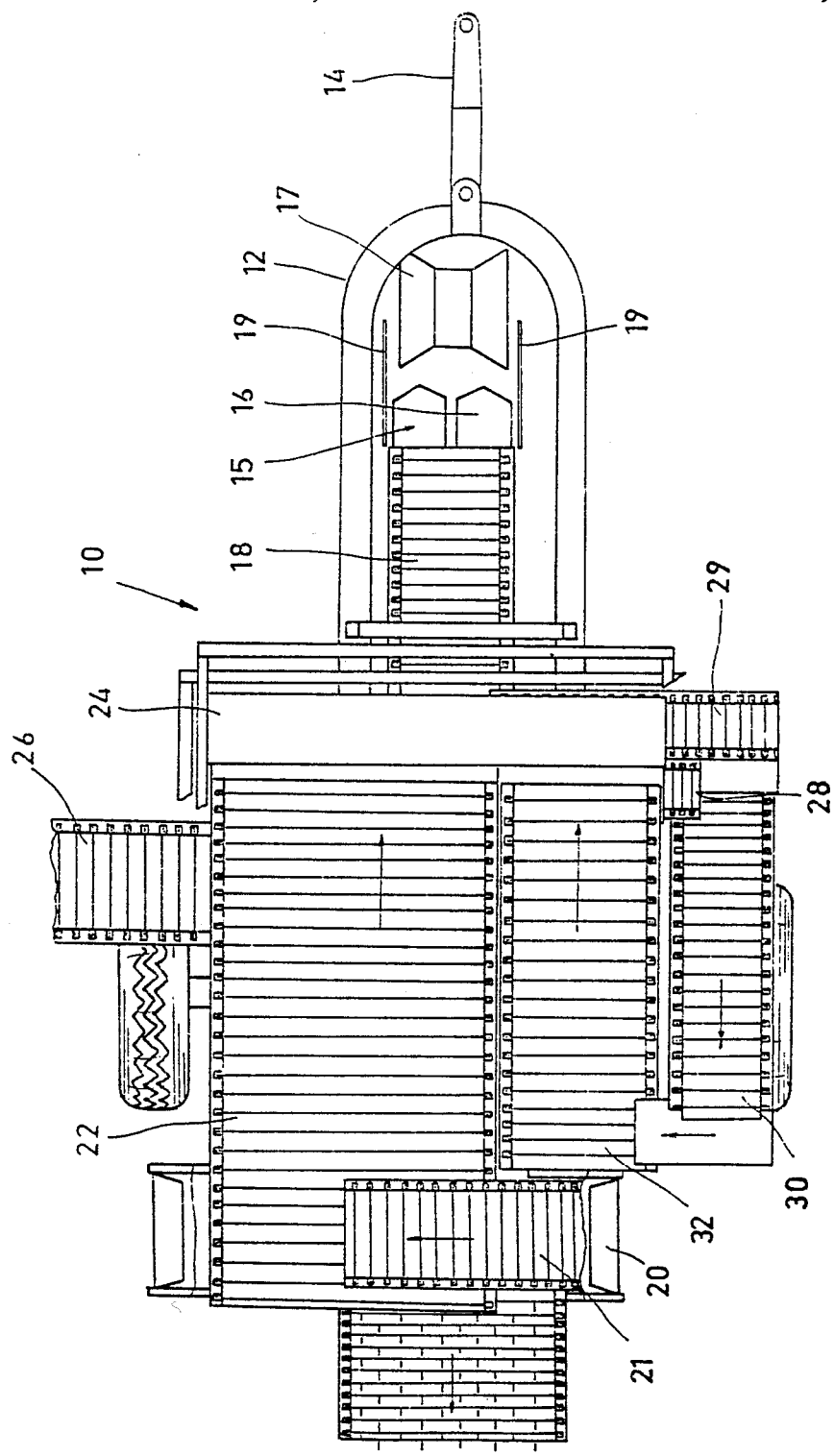
FIGS. 1A, 1B, 1C and 1D are respective top, side, back and partial view illustrations of a separation combine constructed and operative in accordance with a preferred embodiment of the present invention.
Figure 1B:
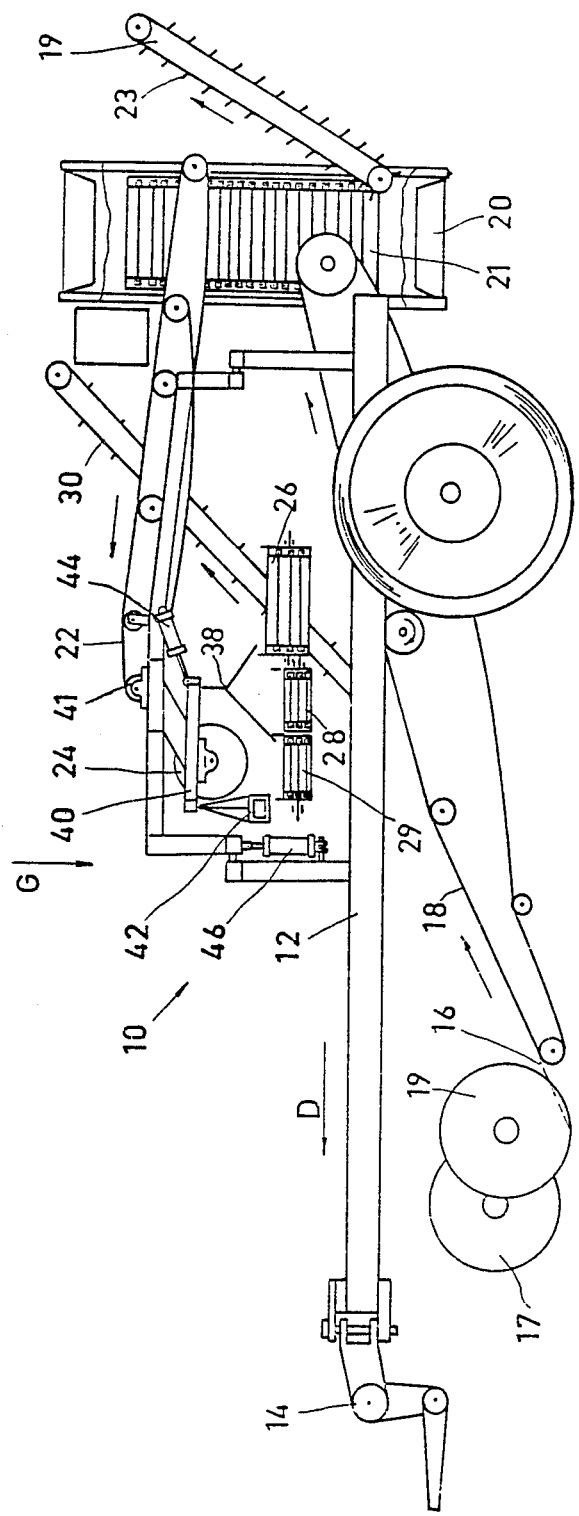
Figure 1C:
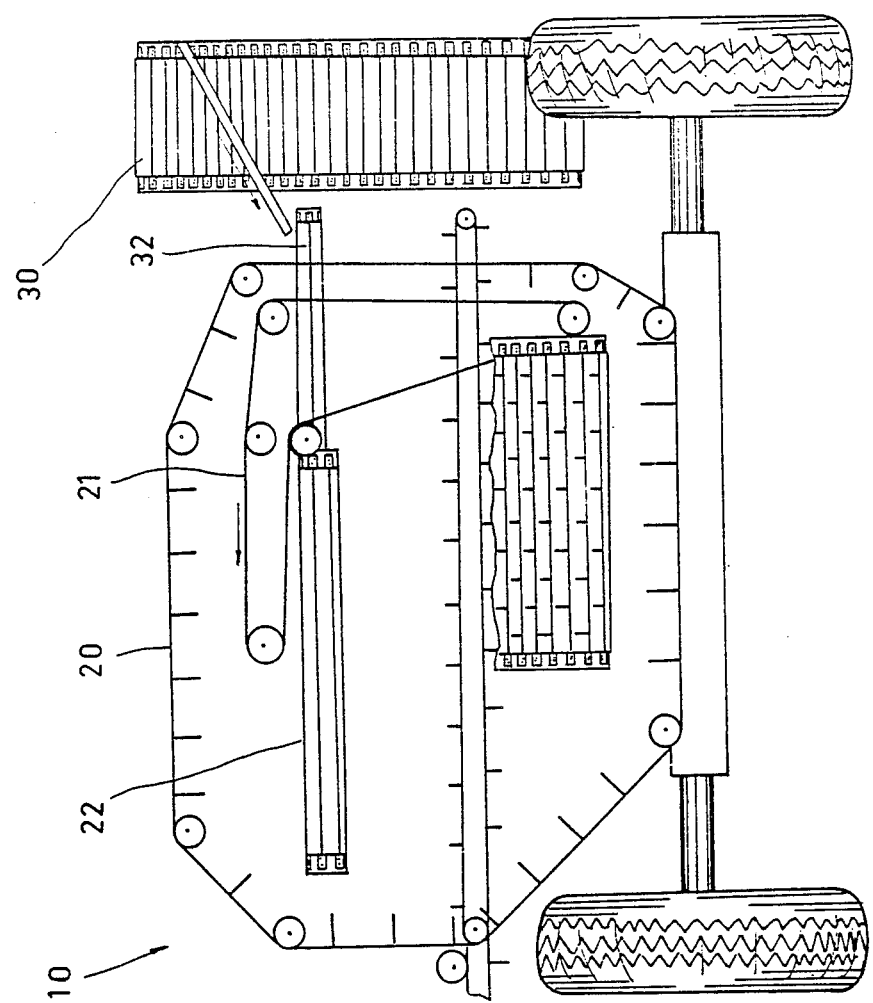
Figure 1D:
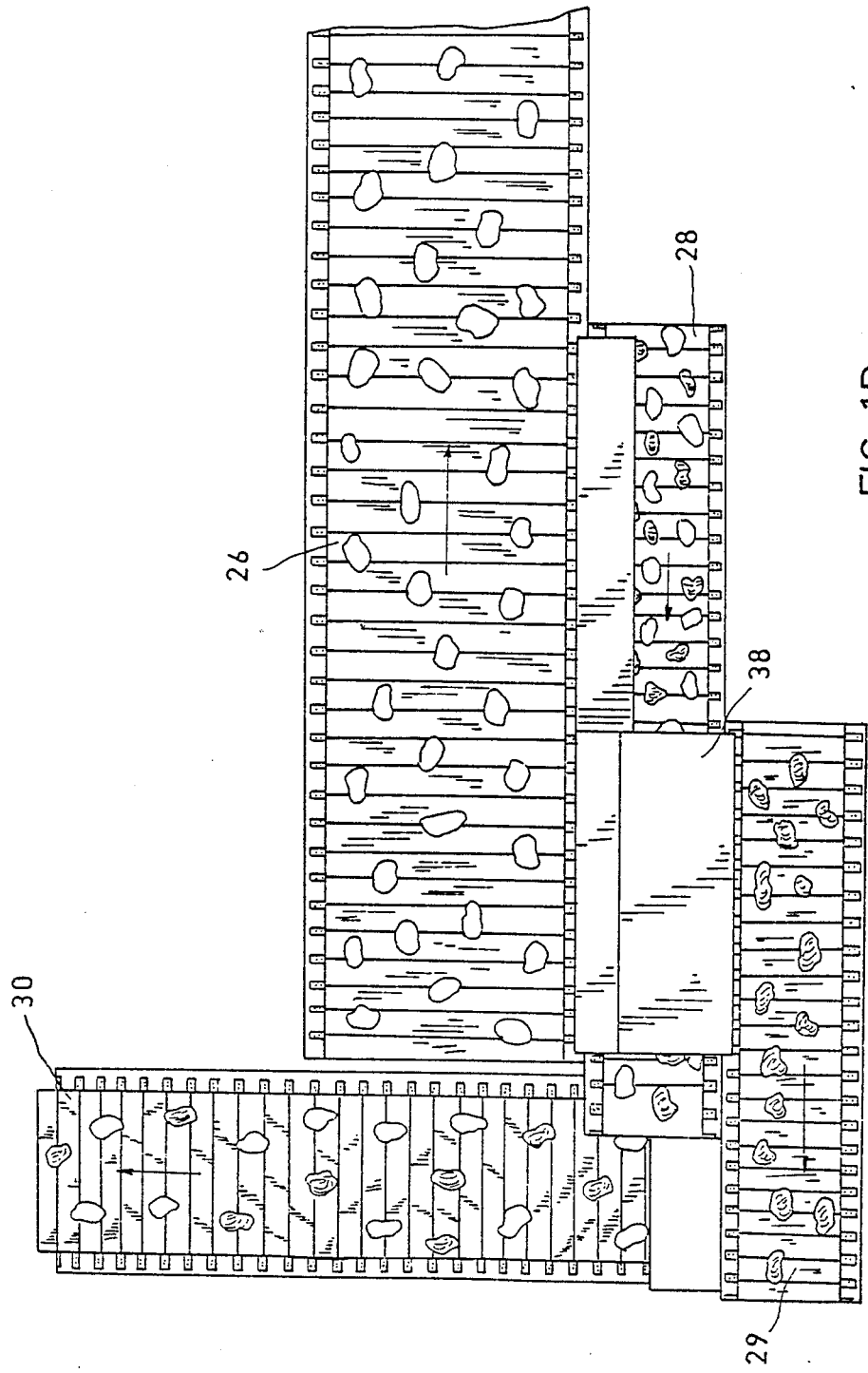

Reference is now made to FIGS. 1A–1D which illustrate combine apparatus for the harvesting and separation of agricultural produce, such as potatoes, from clods and stones constructed and operative in accordance with a preferred embodiment of the present invention. FIG. 1D is a partial view taken along the line D—D in FIG. 1B. The combine apparatus, generally indicated by reference numeral 10, comprises a chassis 12, which may be arranged as shown with a towing attachment 14 to be towed by a tractor, (not shown), or alternatively, may be self propelled.

Mounted on the chassis 12 is conventional cutting apparatus 15, including cutters 16, depth control roller 17, and disks 19 which cut up plant material and prevent potatoes from becoming disengaged from the sides of cutters 16. Cutting apparatus 15 is operative to lift a layer of potato-containing earth onto an inclined initial raising conveyor 18. Conveyor 18 is typically a bar-type conveyor, which allows loose earth to fall therethrough onto the ground. Conveyor 18 supplies a mixture of plant material, clods, stones and potatoes to a plant removal conveyor 19. The clods, stones and potatoes roll down conveyer 19 onto a transverse conveyor 20 which raises the mixture onto a generally horizontal feed conveyor 22. The plant material engages spikes 23 on conveyor 19 and is removed thereby and allowed to fall on the ground. An additional conveyor 21 feeds said mixture onto conveyor 20 and also is operative to prevent potatoes from becoming disengaged from conveyor 20 when conveyor 20 is in a perpendicular orientation relative to the ground.

Conveyor 22 feeds the mixture onto an impact element 24, whose characteristics and operation will be described hereinafter in detail. Depending on the distance which the elements of the mixture, i.e. the potatoes on one hand, and the stones and clods on the other, are bounced, they land on different conveyor belts. The potatoes, which tend to bounce further are carried away on a conveyor 26, which leads to a storage container (not shown). The mixture of stones and clods which may contain a few potatoes is carried by a conveyor 28, which leads to a resupply raising conveyor 30 which feeds the mixture from conveyor 28 onto a generally horizontal feed conveyor 32 which feeds this resupplied mixture back onto a portion of impact element 24, for further separation. The potatoes culled from this separation are supplied on conveyor 26 to a storage container.

Figure 2:
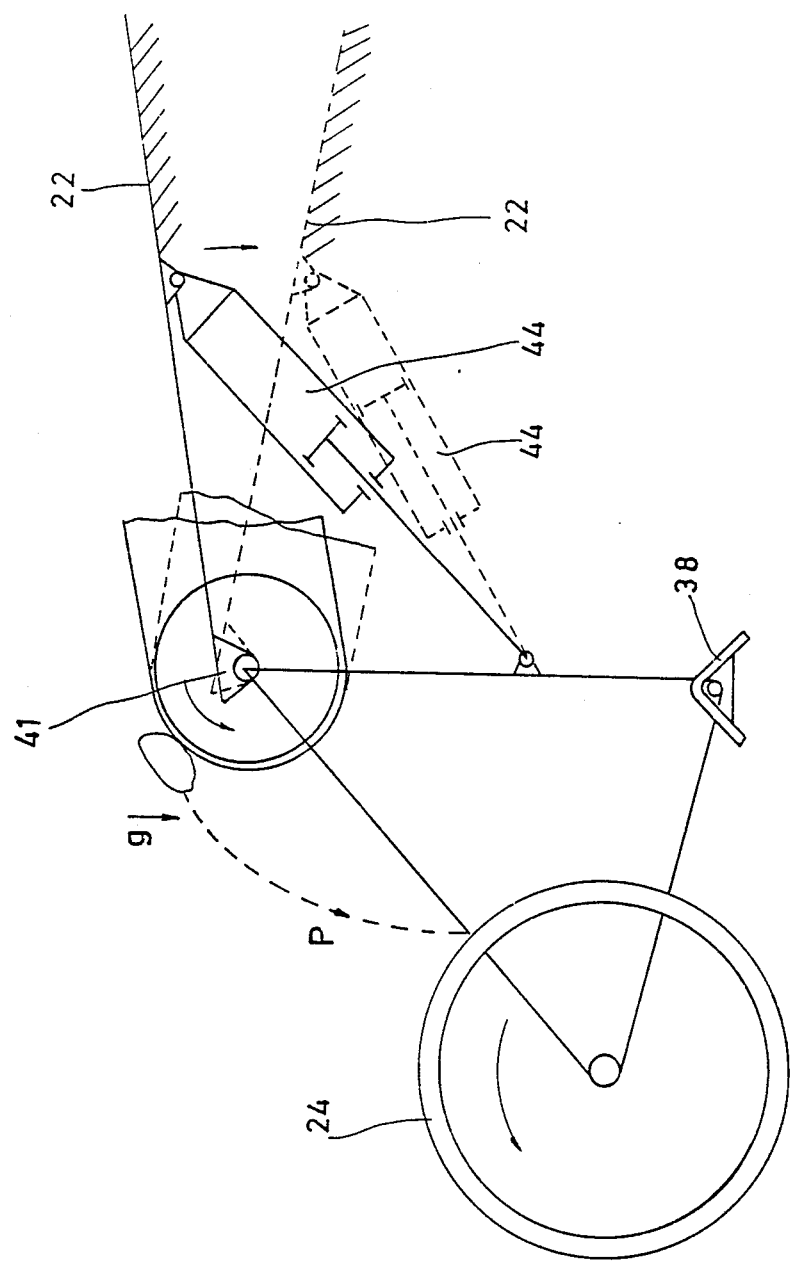
FIG. 2 is a pictorial illustration of apparatus for maintaining desired orientation of the impact element in accordance with the present invention.

Reference is now additionally made to FIG. 2. It is a particular feature of the present invention that notwithstanding differing orientations of conveyor 22, the direction of impingement of the mixture of clods, stones and potatoes P is maintained in a predetermined fixed relationship with respect to the gravitational force vector g providing that the direction of motion D does not deviate substantially from the horizontal, i.e. not more than 7°. This is necessary in order to maintain uniformity of separation notwithstanding variations in the orientation of the chassis 12. In accordance with a preferred embodiment of the present invention, this is accomplished by mounting the impact element 24, and a separation divider 38 on a fixed support 40 which rotates about point 41 so as to constantly maintain its desired orientation relative to the gravitational force vector g, in response to the sensed orientation of the support 40. An orientation sensor 42, such as a pendulum, with associated microswitches, is preferably mounted onto support 40 for sensing the orientation thereof. Orientation sensor 42 provides an electrical output indication of the orientation of support 40 to conventional orientation control apparatus (not shown), such as electrically controlled hydraulic valves, which operate a positioning piston 44, which is operative to determine the orientation of support 40 relative to the gravitational force vector g.

An additional piston 46 may also receive orientation information from sensor 42 and may provide orientation correction for conveyors 22 and 32 and possible additional apparatus in a plane perpendicular to the direction of motion D.

The maintenance of the orientation of impact element 24 and divider 38, explained hereinabove is illustrated in FIG. 2, which shows two different relative orientations of the conveyor and the different extent that piston 44 is extended to maintain the desired orientation of impact element 24 and divider 38.

Figure 3B:
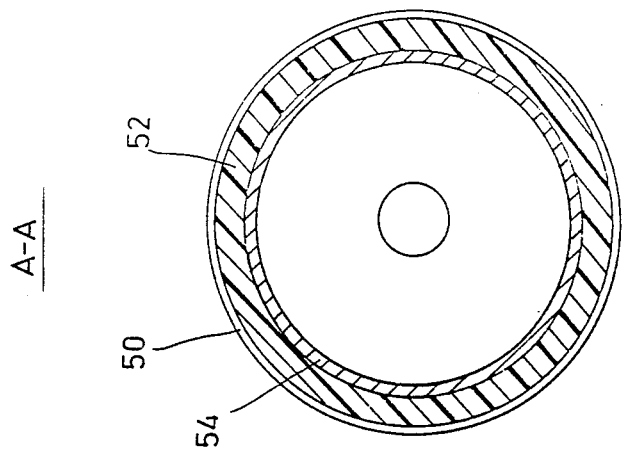
FIGS. 3A and 3B are respective plan and side view illustrations of a resiliently-mounted cylindrical impact element constructed and operative in accordance with an embodiment of the present invention.
Figure 3A:
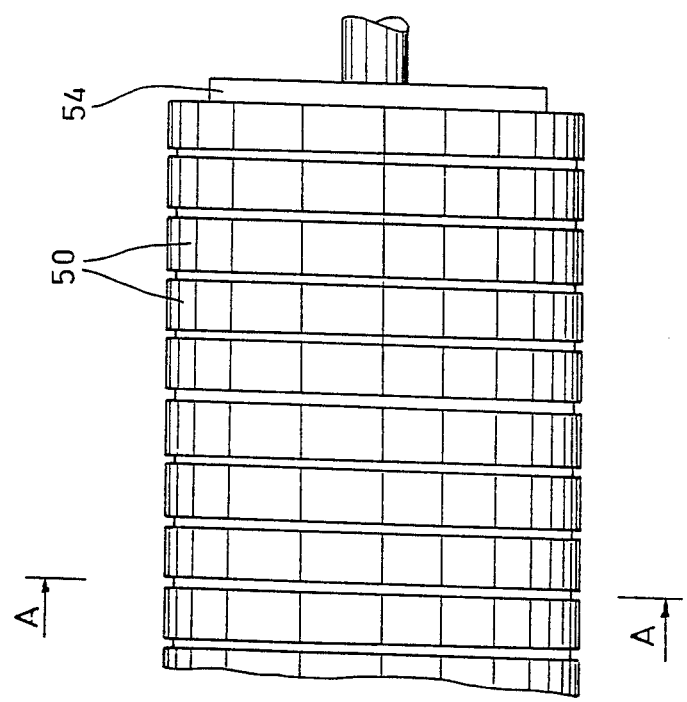

FIGS. 3A and 3B illustrate a preferred embodiment of impact element comprising a plurality of cylindrical rings 50 which are supported on a cylindrical layer of foam rubber 52, which in turn is supported on a cylinder 54, typically formed of steel. According to a preferred embodiment of the present invention, the specifications of the impact surface assembly shown in FIGS. 3A and 3B are as follows: Each ring 50 is made of steel, 8 mm thick and 50 mm wide, having an outer diameter of 320 mm. The foam rubber layer 52 is 16 mm thick and of 35 shore (ASTM RE 43). This embodiment has provided efficient separation of potatoes and stones having the following characteristics (given approximately):

Stone Density: 2.0–3.0 gr/cm$^3$
Stone Weight: 120–470 gr
Potato Density: 0.9 gr/cm$^3$
Potato Weight: 40–300 gr.

The assembly of FIGS. 3A and 3B is designed such that each of rings 50 is generally impinged upon by no more than one falling object at any given time since time is a continous dimension, and impingement occurs at a discrete point along that dimension. Since stones are more rigid and are of a higher density than agricultural produce such as potatoes and other perishable products having a relatilely high water content, they impact on a given ring 50 harder, i.e. with greater force, than do potatoes and the like. This impact produces compression of the foam rubber 52, and consequent retraction of the impact surface.

Compression of the foam rubber is mainly a function of the mass of the impinging item. Since a usual mixture of agricultural produce and stones includes items of both types of varying sizes and masses, a distinction based on mass alone normally is not sufficient for efficient separation, although it does provide separation of heavy stones from relatively light produce items.

The impact force of stones on the impact surface also causes internal vibrations in the ring 50. These vibrations, and bending of the impact element as well as compression of the foam rubber 52, all serve to absorb kinetic energy from the impinging stone and thus to decrease its rebound velocity.

The impact of potatoes and similar agricultural produce on the impact surface does not produce as much bending or internal vibrations in the strip as does the impact of stones. This is due to the relative softness and longer dwell time of the agricultural produce in contact with the impact surface, which prevents a high instantaneous impact force from being developed, since the agricultural produce undergoes compression upon impact, which a stone does not. Furthermore, the agricultural produce may have a sufficiently long dwell time in contact with the impact surface to receive kinetic energy back from the spring support as it rebounds.

Figure 4:
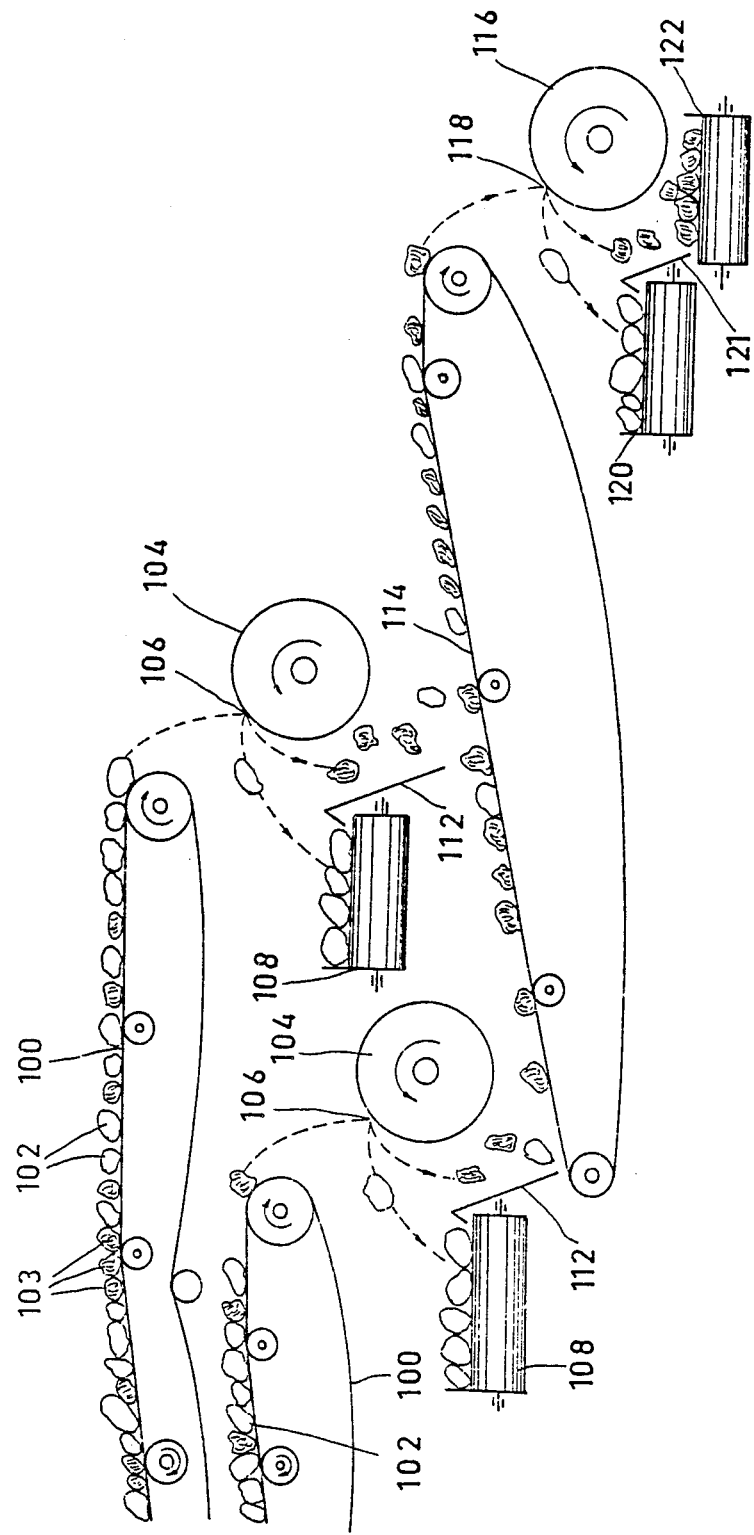
FIG. 4 is a pictorial illustration of multi-stage separation apparatus constructed and operative in accordance with an embodiment of the present invention.

Reference is now made to FIG. 4, which illustrates a high capacity multiple stage separation device constructed and operative according to a preferred embodiment of the present invention. Here it is seen that a conveyor 100 supplies a mixture of potatoes 102, and stones and clods 103, to an impact element 104, which may be similar to the impact element 24 illustrated in FIGS. 1A–3B.

The mixture impinges on the element 104 at an impact surface location 106 having a tangent approximately 45 degrees from the vertical and having a horizontal component of motion opposite to that of the mixture and a downward vertical component of motion.

The potatoes, which bounce relatively far from the impact surface location, impinge on a conveyor 108 and are directed into a collection bin (not shown). The stones and clods, and some potatoes, typically 10%–20% of the total potatoes, which bounce to a region relatively near to the impact surface location impinge on a slide 112 and are directed to a conveyor 114.

In order to provide high capacity processing there is also provided a second conveyor 100 which supplies a mixture of potatoes 102, and stones and clods 103, to a second identical impact element 104. The potatoes impinge on a second conveyor 108 and are directed into a collection bin (not shown). The stones and clods, and some potatoes, impinge on a second slide 112 and are directed to conveyor 114.

In order to enhance the efficiency of separation, conveyor 114 supplies the stones, clods, and some potatoes to a second stage impact element 116. The mixture impinges on the element 116 at an impact surface location 118 having a tangent approximately 45 degrees from the vertical and having a horizontal component of motion opposite to that of the mixture and a downward vertical component of motion.

The potatoes, which bounce relatively far from the impact surface location, impinge on a conveyor 120 and are directed into a collection bin (not shown). The stones and clods and some potatoes which bounce to a region relatively near to the impact surface location impinge on a slide 121 and are directed to a conveyor 122.

Figure 5:
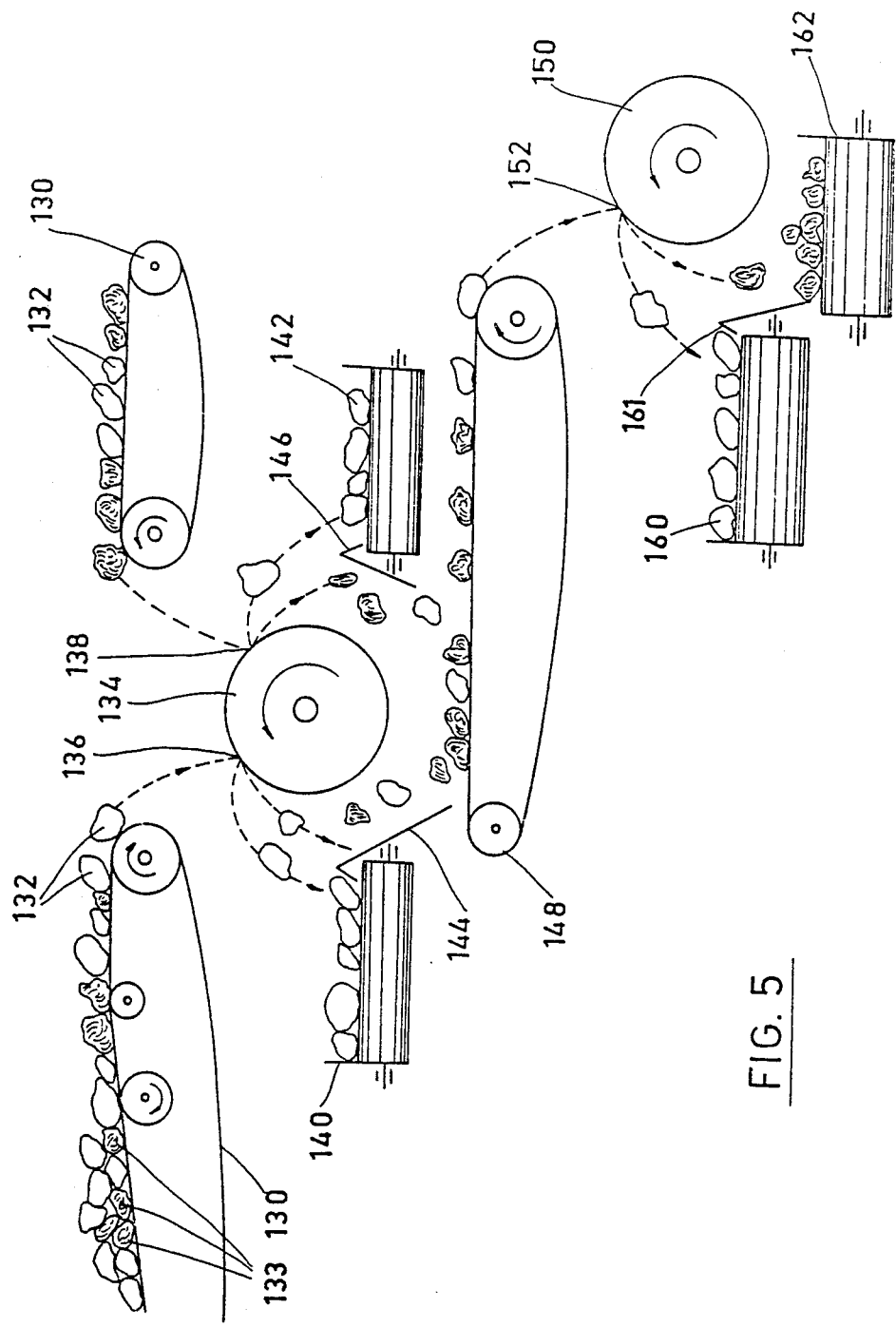
FIG. 5 is a pictorial illustration of multi-stage separation apparatus constructed and operative in accordance with an alternative embodiment of the present invention.

Reference is now made to FIG. 5, which illustrates a high capacity multiple stage separation device constructed and operative according to another preferred embodiment of the present invention. Here it is seen that a pair of conveyors 130 each supply a mixture of potatoes 132 and stones and clods 133 to respective opposite sides of a rotating impact element 134, which may be similar to the impact element 24 illustrated in FIGS. 1A–3B.

The mixture impinges on the element 134 at impact surface locations 136 and 138 each having a tangent approximately 45 degrees from the vertical. Location 136 has a horizontal component of motion opposite to that of the mixture and a downward vertical component of motion, while location 138 has a horizontal component of motion in the same direction as that of the mixture and an upward vertical component of motion.

The potatoes, which bounce relatively far from the impact surface location, impinge on respective conveyors 140 and 142 and are directed into a collection bin (not shown). The stones and clods, and some potatoes, typically about 20% of the total potatoes, which bounce to a region relatively near to the impact surface locations impinge on slides 144 and 146 and are directed to a conveyor 148.

In order to enhance the efficiency of separation, conveyor 148 supplies the stones, clods, and some potatoes to a second stage impact element 150. The mixture impinges on the element 150 at an impact surface location 152 having a tangent approximately 45 degrees from the vertical and having a horizontal component of motion opposite to that of the mixture and a downward vertical component of motion.

The potatoes, which bounce relatively far from the impact surface location, impinge on a conveyor 160 and are directed into a collection bin (not shown). The stones and clods, which bounce to a region relatively near to the impact surface location impinge on a slide 161 and are directed to a conveyor 162.

Figure 6:
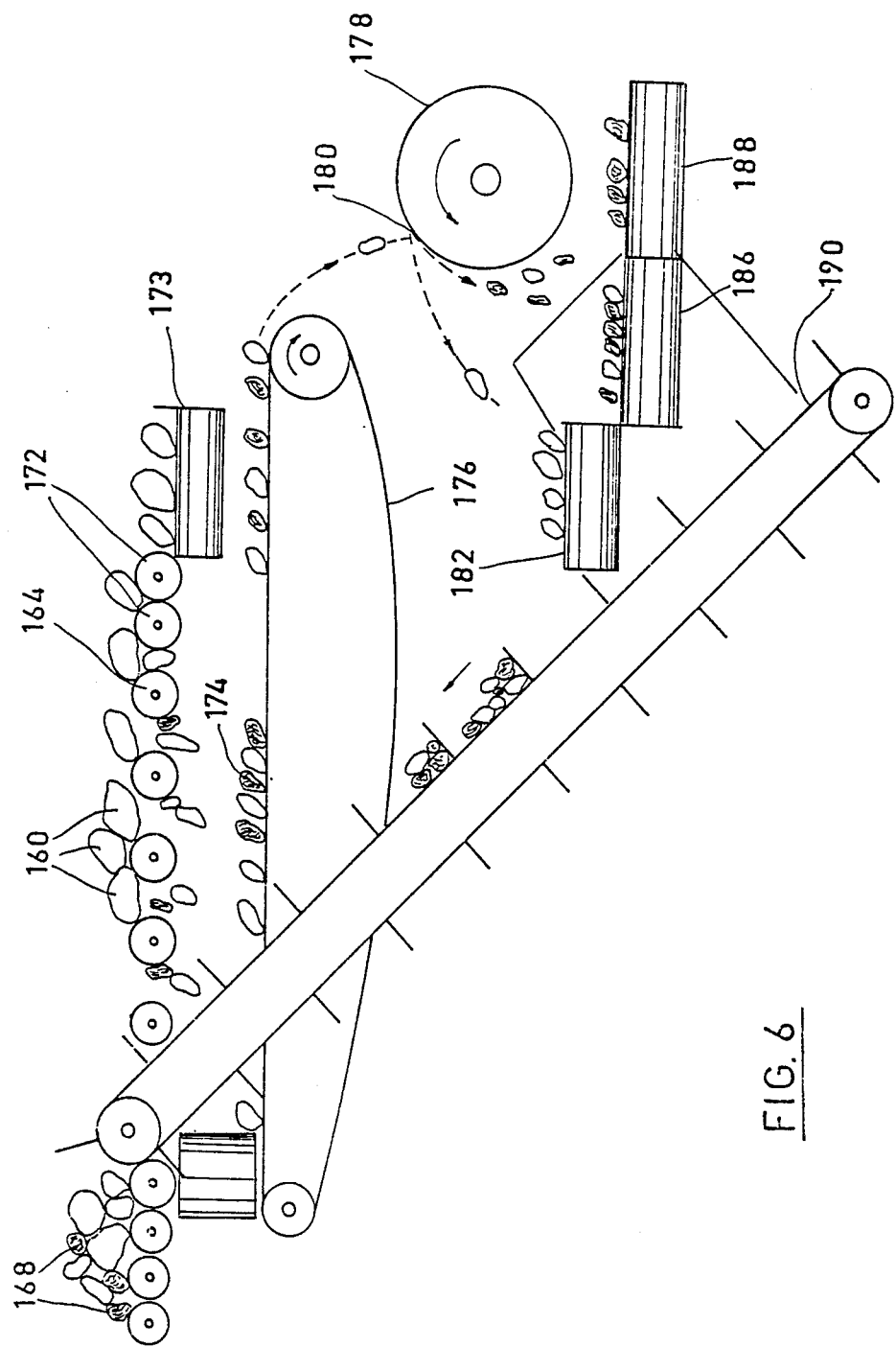
FIG. 6 is a pictorial illustration of multi-stage separation apparatus constructed and operative in accordance with another alternative embodiment of the present invention.

Reference is now made to FIG. 6, which illustrates a high capacity multiple stage separation device constructed and operative according to yet another preferred embodiment of the present invention. Here it is seen that a roller conveyor 164 carries a mixture of potatoes 160 and clods and stones 168 and defines spaces of adjustable dimensions between individual rollers 172 through which a mixture 174 of potatoes small enough to fall between said rollers, stones and clods, falls onto a conveyor 176. Large potatoes which do not fall between the rollers are carried to a conveyor 173. Conveyor 176 supplies the mixture to a rotating impact element 178, which may be similar to the impact element 24 illustrated in FIGS. 1A-3B. This embodiment obviates the necessity of impinging the potatoes too large to fall between said rods, on said impact element 178.

The mixture impinges on the element 178 at an impact surface location 180 having a tangent approximately 45 degrees from the vertical. Location 180 has a horizontal component of motion opposite to that of the mixture and a downward vertical component of motion.

The potatoes which have fallen between the rollers, and which bounce relatively far from the impact surface location, impinge on a conveyor 182 and are directed into a collection bin (not shown). The stones and clods and some of said potatoes, typically about 20% of the total said potatoes, which bounce to a region relatively near to the impact surface location, are directed to a conveyor 186.

In order to enhance the efficiency of separation, conveyor 186 resupplies the stones, clods, and some of the smaller potatoes, via a lifting conveyor 190 back to conveyor 176 for repeated reimpingement onto impact element 178. Clods and stones fall below the impact element 178 and are removed by a conveyor 188.

Figure 7:
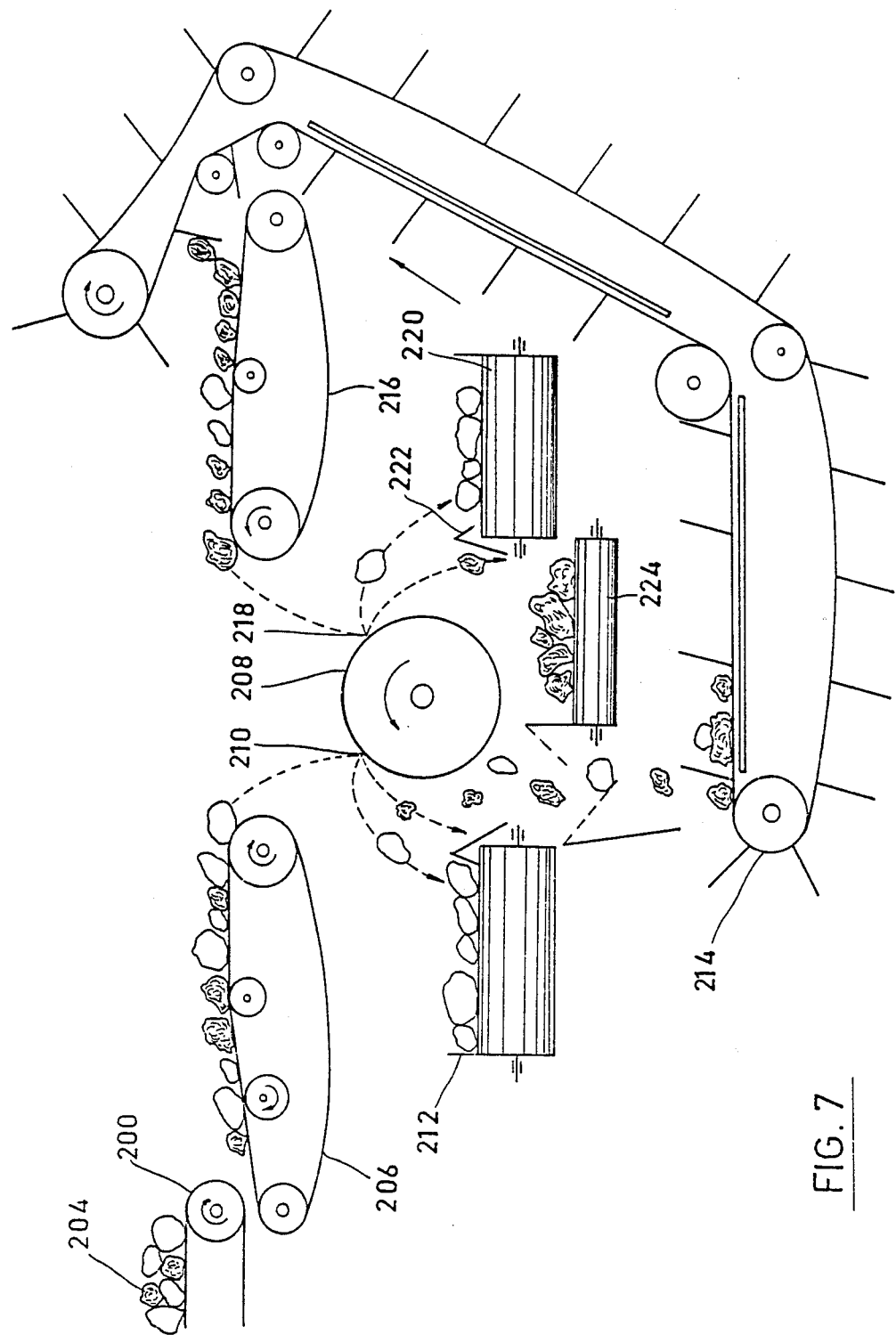
FIG. 7 is a pictorial illustration of multi-stage separation apparatus constructed and operative in accordance with yet another alternative embodiment of the present invention.

Reference is now made to FIG. 7, which illustrates a high capacity multiple stage separation device constructed and operative according to yet another preferred embodiment of the present invention. Here it is seen that a conveyor 200 carries a mixture 204 of potatoes and stones and clods onto a conveyor 206. Conveyor 206 supplies the mixture to a rotating impact element 208, which may be similar to the impact element 24 illustrated in FIGS. 1A-3B.

The mixture impinges on the element 208 at an impact surface location 210 having a tangent approximately 45 degrees from the vertical. Location 210 has a horizontal component of motion opposite to that of the mixture and a downward vertical component of motion.

The potatoes, which bounce relatively far from the impact surface location, impinge on a conveyor 212 and are directed into a collection bin (not shown). The stones and clods and some potatoes, typically about 20% of the total potatoes, which bounce to a region relatively near to the impact surface location, are directed to a conveyor 214.

In order to enhance the efficiency of separation, conveyor 214 resupplies the stones clods and some potatoes, via a feed conveyor 216 to impact element 208. The mixture impinges on the element 208 at an impact surface location 218 having a tangent approximately 45 degrees from the vertical. Location 218 lies opposite to location 210 and has a horizontal component of motion in the same direction as that of the mixture and an upward vertical component of motion.

The potatoes, which bounce relatively far from the impact surface location, impinge on a conveyor 220 and are directed into a collection bin (not shown). The stones and clods which bounce to a region relatively near to the impact surface locations impinge on a slide 222 and are removed by a conveyor 224.

It will be appreciated by persons skilled in the art that the present invention is not limited by what has been particularly shown and described hereinabove. Rather the scope of the present invention is defined only by the claims which follow:

We claim:

1. Mobile combine apparatus for harvesting and separating a mixture of agricultural produce such as potatoes from other materials such as clods and stones comprising:
   an impact element defining an impact surface; and
   means for causing the mixture of agricultural products and stones to impinge on the impact surface in a predetermined direction irrespective of the orientation of the combine apparatus within a given range of operative orientations;
   and wherein said means for causing the mixture of agricultural products and stones to impinge on the impact surface in a predetermined direction irrespective of the orientation of the combine apparatus within a given range of operative orientations comprises means for maintaining the impact surface in a predetermined orientation notwithstanding variations in the orientation of the combine, including an orientation sensor associated with said impact element and means for varying the orientation of said impact element relative to the ground surface underlying the mobile combine apparatus for maintaining the orientation of the impact element relative to the gravitational force vector of the earth in a predetermined orientation.

2. Mobile combine apparatus according to claim 1 and wherein said impact surface comprises:
   a plurality of portions each of which is arranged to be normally impacted by a single stone or item of agricultural produce at any given instant.

3. Apparatus according to claim 1 and wherein said impact element comprises a plate element.

4. Apparatus according to claim 3 and wherein said impact element comprises a curved plate element.

5. Apparatus according to claim 4 and wherein said plate element comprises a curved plate element in the form of a cylindrical ring.

6. Apparatus according to claim 1 and wherein said impact element is operative to absorb kinetic energy from items impacting thereon through bending of said impact element and the propagation of vibrations therethrough.

7. Apparatus according to claim 1 and wherein said impact element is operative to absorb kinetic energy from items impacting thereon as a positive function of the density, mass and hardness of such items.

8. Apparatus according to claim 1 and wherein said impact element comprises a plate element which is resiliently mounted, whereby during the characteristic dwell time of stones in contact with the impact surface, significant energy absorption occurs, while during the longer dwell time of agricultural produce thereon, the net energy absorption is relatively insignificant, thereby causing the restitution coefficient of the agricultural produce to exceed that of the stones.

9. Mobile combine apparatus for harvesting and separating a mixture of agricultural produce such as potatoes from other materials such as clods and stones comprising:
   an impact element defining an impact surface;
   means for causing the mixture of agricultural products and stones to impinge on the impact surface in a predetermined direction irrespective of the orientation of the combine apparatus within a given range of operative orientations;
   first collection means disposed in a first region with respect to the impact surface for receiving agricultural produce bounced from the impact surface within a first range of distances; and second collection means disposed alongside the first region for receiving a mixture of unseparated agricultural produce, clods and stones bounced from the impact surface; and means for resupplying the mixture of unseparated agricultural produce from the second collection apparatus back to an impact surface for repeated separation, and wherein said means for causing the mixture of agricultural products and stones to impinge on the impact surface in a predetermined direction irrespective of the orientation of the combine apparatus within a given range of operative orientations comprises means for maintaining the impact surface in a predetermined orientation notwithstanding variations in the orientation of the combine, including an orientation sensor associated with said impact element and means for varying the orientation of said impact element relative to the ground surface underlying the mobile combine apparatus for maintaining the orientation of the impact element relative to the gravitational force vector of the earth in a predetermined orientation.

10. Apparatus according to claim 9 and also comprising:

third means disposed below the impact element for receiving clods and stones bounced from the impact surface and returning them to the ground.

11. Apparatus according to claim 9 and also comprising:

means for limiting the resupply from the second collection means to one resupply cycle.

* * * * *